US011129035B2

(12) United States Patent
Van Doorselaer et al.

(10) Patent No.: US 11,129,035 B2
(45) Date of Patent: Sep. 21, 2021

(54) METHOD FOR ANALYSING A WIRELESS LINK OF A WI-FI NODE, RESPECTIVE CIRCUIT PERFORMING THE METHOD, AND APPLICATION

(71) Applicant: AIRTIES BELGIUM SPRL, Woluwe-Saint-Lambert (BE)

(72) Inventors: Karel Van Doorselaer, Woluwe-Saint-Lambert (BE); Stuart Timms, Woluwe-Saint-Lambert (BE); Koen Van Oost, Woluwe-Saint-Lambert (BE)

(73) Assignee: AIRTIES BELGIUM SPRL, Woluwe-Saint-Lambert (BE)

( * ) Notice: Subject to any disclaimer, the term of this patent is extended or adjusted under 35 U.S.C. 154(b) by 50 days.

(21) Appl. No.: 16/519,837

(22) Filed: Jul. 23, 2019

(65) Prior Publication Data

US 2019/0349800 A1 Nov. 14, 2019

Related U.S. Application Data

(63) Continuation of application No. 15/537,428, filed as application No. PCT/EP2015/080269 on Dec. 17, 2015, now Pat. No. 10,362,502.

(30) Foreign Application Priority Data

Dec. 18, 2014 (EP) ..................................... 14307074

(51) Int. Cl.
*H04W 24/08* (2009.01)
*H04L 12/26* (2006.01)
(Continued)

(52) U.S. Cl.
CPC ........... *H04W 24/08* (2013.01); *H04L 43/045* (2013.01); *H04L 43/0888* (2013.01);
(Continued)

(58) Field of Classification Search
CPC .... H04W 24/06; H04W 24/08; H04L 43/045; H04L 43/0888; H04L 43/16; H04L 43/50
See application file for complete search history.

(56) References Cited

U.S. PATENT DOCUMENTS 7,426,395 B2  9/2008 Stephens
8,830,849 B2  9/2014 Gaal et al.
(Continued)

FOREIGN PATENT DOCUMENTS

CN   102315904      2/2014
CN   103731858 A    4/2014
(Continued)

OTHER PUBLICATIONS

Benetallo et al., "A passive Measurement Tool for Monitoring Wireless Packet Network Performances," IMTC Instrumentation and Measurement Technology Conference, Como, Italy, Jul. 18, 2004, pp. 407-412.
(Continued)

*Primary Examiner* — Rhonda L Murphy
(74) *Attorney, Agent, or Firm* — Volpe Koenig

(57) ABSTRACT

A method for analyzing a wireless link (3) of a wireless node of a customer premises equipment (CPE) device (1) during operation of the CPE device comprises: performing an active test, during which a data transmission is forced through the wireless link, to obtain a first set of parameters, and performing before or after the active test a passive test, which is a monitoring ode during which a data transmission of the CPE device is monitored, to obtain a second set of parameters. In particular, based on the first set of parameters, it is determined whether and to which extent the wireless link is in an uncertainty zone, and based on the second set
(Continued)

of parameters, the decision is made to assign an observed decrease in a measured data rate to physics effects or to interference effects.

16 Claims, 6 Drawing Sheets

(51) Int. Cl.
*H04W 24/06* (2009.01)
*H04W 28/22* (2009.01)

(52) U.S. Cl.
CPC ............. *H04L 43/16* (2013.01); *H04L 43/50* (2013.01); *H04W 24/06* (2013.01); *H04W 28/22* (2013.01)

(56) References Cited

U.S. PATENT DOCUMENTS

| | | | |
|---|---|---|---|
| 2005/0249157 A1* | 11/2005 | Qian | H04L 43/0829 370/329 |
| 2013/0094631 A1 | 4/2013 | Beattie, Jr. | |
| 2013/0301443 A1 | 11/2013 | Bharghavan | |
| 2013/0322286 A1 | 12/2013 | Van Doorselaer et al. | |
| 2014/0036691 A1 | 2/2014 | Madan et al. | |
| 2014/0153434 A1 | 6/2014 | Kokovidis et al. | |
| 2014/0219111 A1 | 8/2014 | Duet et al. | |
| 2015/0200834 A1* | 7/2015 | Yun | H04L 43/50 370/252 |

FOREIGN PATENT DOCUMENTS

| | | |
|---|---|---|
| WO | 2002093839 A2 | 11/2002 |
| WO | 2014/011191 | 1/2014 |
| WO | 2014/011192 | 1/2014 |
| WO | 2014/145073 | 9/2014 |
| WO | 2015/044343 | 4/2015 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specification, IEE Std. 802.11-2012 (Mar. 29, 2012).

Iu et al., "Various Detection Techniques and Platforms for Monitoring Interference Condition in a Wireless Testbed," Measurement Methodology and Tools, LNCS vol. 7586, Springer, Berlin, 2013, pp. 43-60.

Parissis et al., "An open architecture for monitoring and measuring QoS indicators in wireless community networks," Next Generation internet Networks, Krakow, Poland, Apr. 28, 2008, pp. 284-291.

\* cited by examiner

METHOD FOR ANALYSING A WIRELESS LINK OF A WI-FI NODE, RESPECTIVE CIRCUIT PERFORMING THE METHOD, AND APPLICATION

CROSS REFERENCE TO RELATED APPLICATIONS

This application a continuation of U.S. patent application Ser. No. 15/537,428 filed on Jun. 18, 2017 which is the U.S. National Stage, under 35 U.S.C. § 371, of International Application No. PCT/EP2015/080269 filed Dec. 17, 2015, which claims priority to European Patent Application No. 14307074.6, filed Dec. 18, 2014 the contents of which are hereby incorporated by reference herein.

TECHNICAL FIELD

The present disclosure relates to the field of wireless nodes and respective devices communicating with each other via a wireless communication.

BACKGROUND

Access gateways are widely used to connect devices in a home to the Internet or any other wide area network (WAN). Access gateways use in particular digital subscriber line (DSL) technology that enables a high data rate transmission over copper lines or optical lines.

Residential gateways, as well as other devices such as routers, switches, telephones and set-top boxes, are understood in this context as customer premises equipment (CPE) devices.

Access gateways including wireless technology have a key role in today's home and professional environments. A mechanism for connecting wireless devices to a local area network (LAN) is called Wi-Fi, which is a brand name of the Wi-Fi Alliance for devices using the IEEE 802.11 family of standards for wireless data transmission. The IEEE 802.11 standards define two types of wireless nodes, a general wireless device that can connect to other devices called a station (denoted as STA) and a special type of a STA that is in control of the network, namely an access point (denoted AP). A Wi-Fi network, often called a WLAN (wireless local area network), consists of an AP with one or several STA connected to the AP.

Due to its flexible and "invisible" nature, a lot of LAN applications are utilizing Wi-Fi rather than the classical wired Ethernet approach. This widespread usage of wireless LAN has exposed however a serious downside of using a shared medium technology: interference. Interference, both Wi-Fi and non-Wi-Fi related, leads to a degraded user experience due to the nature of IEEE 802.11. In its most common form, IEEE 802.11 networks apply a medium access method in which collisions are avoided by sensing that the medium is used (denoted as CSMA-CA). The medium access method is also commonly known as "listen before talk", describing the essence of the method and is referred to as "Clear Channel Assessment" (CCA). Clear channel assessment determines whether a wireless communication channel is "occupied", e.g., "busy" with another wireless communication and/or has an amount of interference that makes the wireless communication channel unsuitable for communication. In this way, it is determined whether the wireless communication channel is available or not available for communication, e.g. occupied or not occupied.

Another impact of interference can be packet loss at the receiver side, leading to a reduction of the physical layer rate. The physical layer rate, also referred to in the following as "TrainedPhyRate" or modulation rate, relates to the transfer rate on the physical layer of the wireless connection. The IEEE 802.11 MAC protocols use rate adaptation mechanisms for evaluating the properties of the wireless channel and select an appropriate physical layer rate. In this case, the interference is not detected by the CCA of the transmitter, but is decreasing the SINR (Signal to Noise and Interference Ratio) of the Wi-Fi packets as seen by the receiver. Typically, Wi-Fi nodes will react to packet loss by lowering the physical layer rate used towards a more robust—but slower—physical layer rate in an attempt to increase the chance of successfully transmitting packets.

Therefore, in certain circumstances, the Wi-Fi connection can suffer from poor performance and even connection loss. Some of these circumstances are obvious and easy to explain to an end user. For example, if the distance between the station and the AP is too large, then signal levels are low and performance will degrade. Other circumstances are "invisible" and not understood by the end user, e.g. a hidden node. A hidden node is invisible to some of the nodes of a network, leading to a practical failure of the CSMA-CA method, which can cause packet collision/corruption over air. In many cases, the end user is not able to diagnose the problem source and correct the issue.

For in-home Wi-Fi networks, connectivity and performance issues are correspondingly one of the main Internet service provider support costs and causes for help-desk calls. Today's focus for operators is mainly on Wi-Fi network installation, associating a station with an AP. Internet service providers are therefore searching for ways to get a better understanding of the end user's wireless environment including link quality and performance.

The ideal way to analyze Wi-Fi issues, e.g. connection setup, interference, throughput, etc., is by looking into the master node of the wireless LAN, namely the AP. The AP, as defined in IEEE 802.11, controls the network, hence all data and network control is visible by the AP. The AP today can deliver statistics regarding packet transmission and signal levels. But the real issue why a link is dropped or why throughput is low, remains hidden to the internals of the AP. Today, at best an AP can deliver statistics but no view on what is actually happening in the wireless network.

Wi-Fi performance can be degraded because of the following categories. For each category, a different action has to be taken to improve things:

Power Save settings of the Station
    Change power save setting of the station
Sharing the medium (properly) with other Wi-Fi devices
    Use another channel that is less occupied (or prioritize Wi-Fi traffic properly using e.g. Wi-Fi Multimedia priorities (WMM, IEEE 802.11e)
Interference at Transmitter side
    Change to channel without interference (or remove interference source)
Interference at Receiver side
    Change to channel without interference (or remove interference source)
Physics: high path loss, impossibility to set up multiple spatial streams
    move AP or station The problem to solve is to have an application that can correctly analyze Wi-Fi performance issues and indicate the correct category causing the issue, so that the end user can be guided to a suitable corrective action.

SUMMARY

The method for analyzing a wireless link of a wireless node of a customer premises equipment device during operation of the CPE device comprises: performing an active test, during which a data transmission is forced through the wireless link, to obtain a first set of parameters, and performing before or after the active test a passive test, which is a monitoring mode during which a data transmission of the CPE device is monitored, to obtain a second set of parameters. In particular, based on the first set of parameters, it is determined whether and to which extent the wireless link is in an uncertainty zone, and based on the second set of parameters, the decision is made to assign an observed decrease in a measured data rate (TrainedPhyRate) to physics effects or to Far End Interference effects.

In an aspect of the invention, the TrainedPhyRate is determined by an active test, during which the wireless link is fully loaded.

In another aspect of the invention, during the passive test, samples of one or several of the following parameters are measured in a time interval: Received Signal Strength (RSSI), modulation rate (Physical Layer Rate) and/or the number of spatial streams used for the wireless link, and an average for that parameters is calculated over the test interval by including a filtering of said parameters to avoid artefacts caused by power save mechanisms.

In a preferred embodiment, the passive test follows immediately the active test, and/or the active test follows immediately the passive test, without any pause.

BRIEF DESCRIPTION OF THE DRAWINGS

Exemplary embodiments of the present disclosure are explained in more detail below by way of example with reference to schematic drawings, which show.

DESCRIPTION OF PREFERRED EMBODIMENTS

Figure 1:
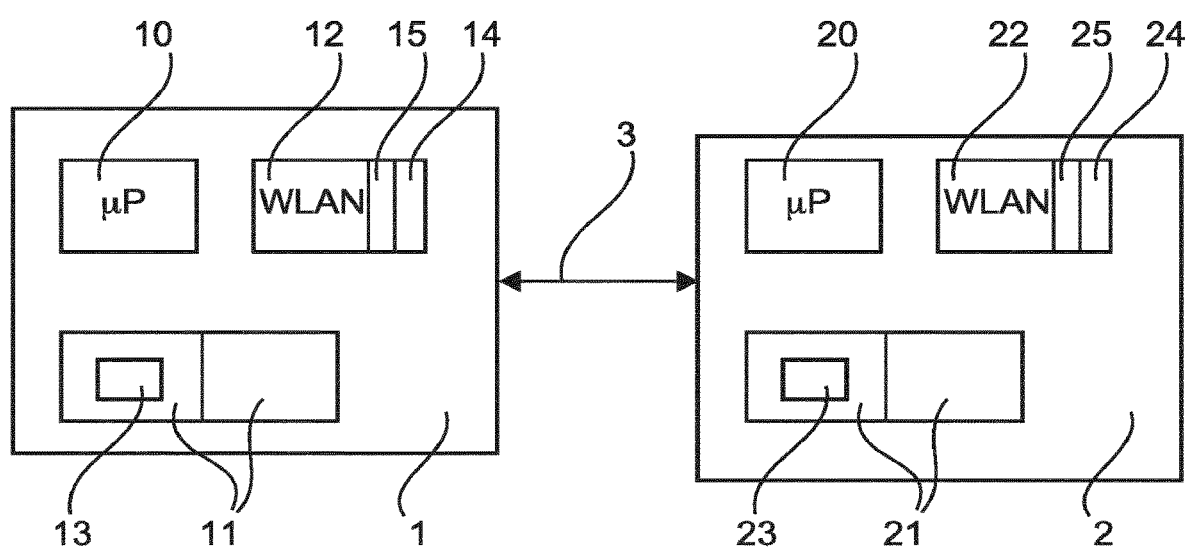
FIG. 1 a system illustrating an access point communicating with a station via a wireless communication, FIG. 2 a chart illustrating data rates of a wireless communication according to FIG. 1, FIG. 3 a test application including a coordinator for an active test and a monitor for a passive test, FIG. 4 a chart illustrating two sets of measured data for IEEE 802.11n 2×2 streams between an AP and a STA in an interference-free environment, FIG. 5 the chart of FIG. 4, including categories for the data rates, and FIG. 6 test results being displayed on a display as consecutive blocks forming a semi-circle.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for instructional purposes to aid the reader in understanding the principles of the disclosure and the concepts contributed by the inventors to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In the following description, example methods for analyzing a wireless (Wi-Fi) link of a wireless node of a customer-premises equipment device (CPE) are described, as well as respective devices performing the methods. For purposes of explanation, various specific details are set forth in order to provide a thorough understanding of preferred embodiments. It will be evident, however, to one skilled in the art that the present principles may be practiced without these specific details.

A CPE device includes, but is not limited to, in an embodiment a processor, e.g. a microprocessor, a memory, in which an operating system is stored for the operation of the CPE device, a wireless node for a wireless operation, and a broadband connection, e.g. an xDSL connection. The wireless node includes, but is not limited to, a complex software driver, a physical layer with data buffers, and an antenna. A CPE device of this kind is for example an access gateway, e.g. a residential gateway, which has a central position within a wireless local area network (WLAN).

The wireless node is controlled by the software driver, which executes a number of background tasks during operation of the wireless node, e.g. dynamic rate adaptation, packet aggregation, channel quality monitoring, and the like. On top of signal manipulations, the software driver also embeds an IEEE 802.11 protocol stack with an associated IEEE defined management and control messaging. The software driver will hence inject a number of management and control packets into the data stream, making it difficult to analyze a link by transparently looking at the data frame exchange only.

An arrangement illustrating a wireless communication is schematically depicted in FIG. 1: An access point 1 communicates with a station 2 via a wireless link 3. The access point 1 includes a circuit comprising a microprocessor 10, a memory 11, a wireless node 12 for the wireless communication, and a test application 13.

The station 2 includes a second circuit comprising a microprocessor 20, a memory 21, a wireless node 22 for the wireless communication, and a test application 23. The wireless node 12 includes a physical layer 14 and a link layer 15, and the wireless node 22 includes a physical layer 24 and a link layer 25. The access point 1 is for example a residential gateway establishing with the station 2 a home network of an end-user.

The test application 13 comprises instructions for the microprocessor 10 and the test application 23 comprises instructions for the microprocessor 20, which instructions are included for diagnosing the wireless link 3 and which gather an information set about the wireless link 3. The information set includes in particular achievable data rate, physical layer data rate, multiple spatial streams, channel bandwidth, medium availability and a Received Signal Strength Indicator (RSSI). These data can be gathered in a passive mode, in which a data transmission is monitored between the access point 1 and the station 2 or vice versa, or in an active mode, in which a data transmission is forced between the access point 1 and the station 2.

In the active mode, the test application 13 in the access point 1 is trying to push as many data as possible through the wireless link 3 to the station 2 during a specific test period. In order to avoid any artefacts, the test application 13 is situated purely at a Media Access Control (MAC) layer (layer 2). For this active test, no functionality is required at the station 2: according to Wi-Fi unicast frame acknowledgements, the test application 13 in the gateway can autonomously measure the layer 2 data rate during the active test. This takes care of testing the Wi-Fi performance, which is only one step.

Figure 2:
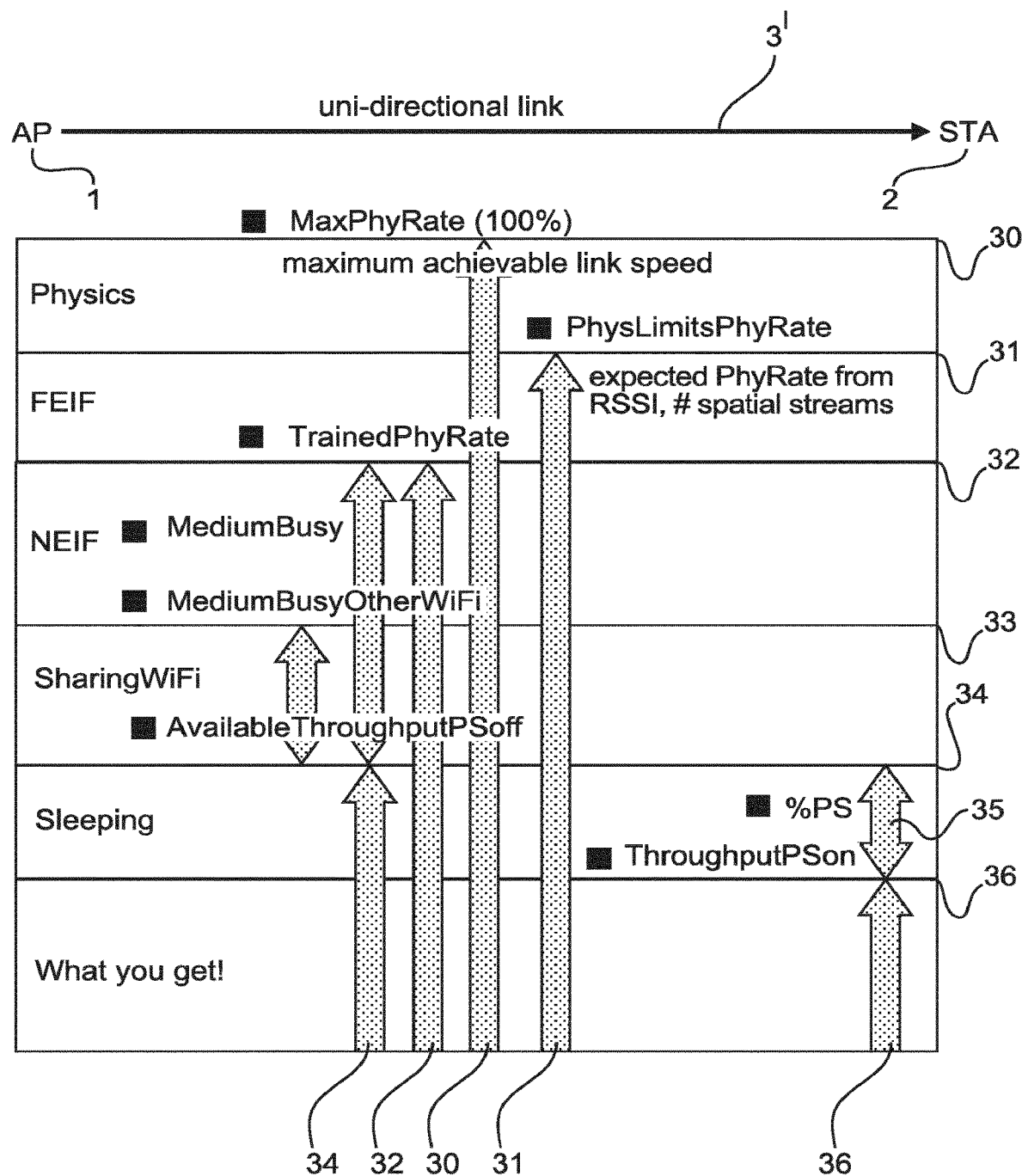

FIG. 2 illustrates the possibilities which have to be considered when diagnosing the Wi-Fi performance of the access point 1 and the station 2. An unidirectional link 3' from the access point 1 to the station 2 is examined in this embodiment. A theoretical maximum data rate 30 for this link is given by the capabilities of the access point 1 and the station 2, called here MaxNegotiatedPhyRate or MaxPhyRate, which is for example 130 MB/s, in case of IEEE 802.11n with 20 MHz channel bandwidth and two spatial streams (and no short guard interval) is selected for the transmission between the access point 1 and the station 2. This is thus the maximum achievable link speed, 100%, which is only a theoretical value. This is taken as a reference for the tested performance as well as for the different categories of performance. The maximum available physical layer rate for the transmission between the access point 1 and the station 2, MaxPhyRate 30, as negotiated, can be obtained by including the maximum available data rates for the IEEE standards 802.11b, 802.11g and 802.11n as a function of the number of spatial streams (MIMO Configuration), channel bandwidth (20 or 40 MHz), and SGI (Short Guard Interval) enabled or not enabled.

In practice, for most situations, physical limitations come into play: the received signal strength RSSI at the station side is reduced for example due to the distance between the access point 1 and the station 2 and a path loss due to any walls or other obstacles and reflections. Also the number of spatial streams has to be determined. The practically attainable physical layer rate 31 in ideal conditions and in the absence of any interference, called here PhysLimitsPhyRate, is therefore less than the maximum data rate 30.

Further performance can be lost due to interference on the station 2 side, which is not seen by the access point 1, called here far end interference FEIF: this can be any microwave source like RF Babyphone, microwave oven or a hidden Wi-Fi node, and leads to a further reduced data rate, called here TrainedPhyRate 32. Similar interference can appear at the access point 1, called here near end interference NETF: This will reduce the available data rate 32 to a data rate 33. Further performance can be lost by sharing the medium with other Wi-Fi traffic. This is caused in particular by Wi-Fi traffic in the home network caused by other stations of the end-user. This reduced data rate 34 is called here AvailableThroughputPSoff describing the available data throughput with power save modus: off. Another reduction of the data rate can be caused by performance lost due to any power save mode, for example a power save mode implemented in a mobile device, e.g. a smartphone acting as the station 2: Some percentage of its time, the station 2 may be in a sleeping mode, called her % PS 35. The final data rate 36 is the final result that the end-user can get as the real data rate from the access point 1 to the station 2, called here ThroughputPSon 36.

In order to monitor the data traffic of the physical layer, the layer 1 of the OSI (Open Systems Interconnection Model) model, the traffic that is transmitted and received by the Wi-Fi node of the access point 1, the test application 13 of the access point 1 receives all received and transmitted packets. The test application 13 has access to the following blocks:

Transmit (TX) packet queue, TX packets
Receive (RX) packet queue, RX packets
Transmit/Receive signal indicators (RSSI values)

Figure 3:
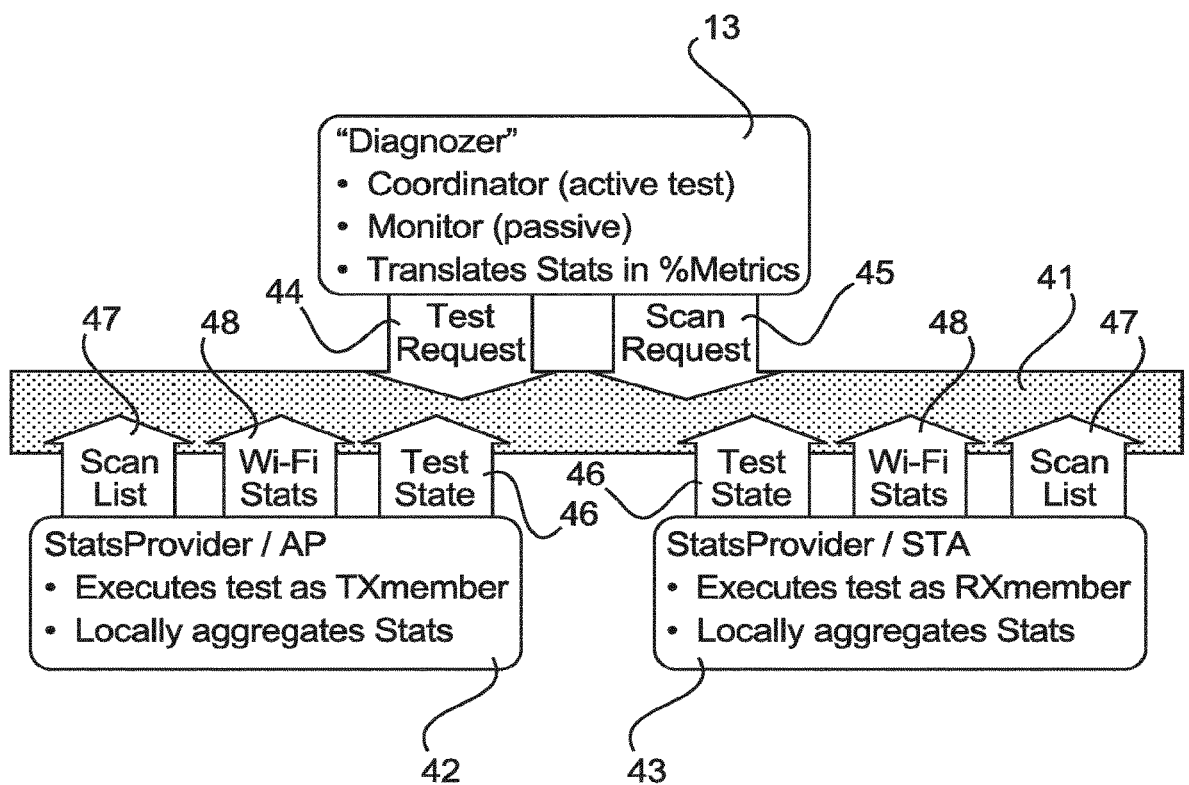

The test application 13 is illustrated in FIG. 3 as a "Diagnozer", which is a coordinator for an active test and a monitor for a passive test, and converts received data and link speeds in percentages and presents the results to the end-user. The test application 13 is connected via a data bus 41 with a statistics provider 42 included in the access point 1 and a statistics provider 43 included in the station 2. The data bus 41 uses for example a publish/subscribe messaging system for an exchange of control commands and data with the statistics providers 42 and 43.

The test application 13 requests a test request 44 or a scan request 45, which are submitted via the data bus 41 to the statistics providers 42, 43. The test request 44 can be a passive monitoring test or an active test. Via the scan request 45, a scan list 47 with recognized neighboring WLAN nodes is requested from the access point 1 and/or the station 2. The statistics providers 42, 43 provide test state information 46 and provide, when required, the scan list 47, which includes all neighboring WLAN nodes being recognized when the access point 1 and/or the station 2 scan the WLAN channels, and "Wi-Fi Stats", measured data rates and other statics data 48 being obtained by the tests.

The data provided in this embodiment by the statistics provider 42, called here also transmit (TX) member, include in particular measured data rates: MaxPhyRate 30, PhysLimitsPhyRate 31, TrainedPhyRate 32, MediumBusy, MediumBusyOtherWi-Fi 33, % PS 35, ThroughputPSon 36, etc. The data transmitted by the statistics provider 43, called here also receive (RX) member, include in particular RSSI and the scan list.

The test request 44 as published via the data bus 41 by the test application 13 includes further a test identification number (TestRequest.id), MAC addresses of receive member and transmit member, (sourceMAC, destinationMAC), test type: ping test or layer 2 test, configuration, etc. The test can be a normal test, in which the receive member is a statistics provider and publishes for example station statistics to the test application 13. The test can be also a blind test, in which the receive member is an associated station not providing any statistics, and the transmit member executes a test autonomously. In this case, the test application 13 can use information only from the access point 1, the transmit member. The scan request 45 is an event and published by the test application 13. The scan list 47 is a state and is published by everyone having subscribed to the scan request 45.

For the statistics being provided by an active test, the test measurements are synchronized between the access point 1 and the station 2. For a passive monitoring, synchronization is not required.

The statistics providers 42, 43 publish locally aggregated statistics via the data bus 41, for example every 30 sec in case of passive monitoring, except when interrupted by an active test. In case of passive monitoring, the station 2 samples RSSI and receive data rates every second and calculates a filtered RSSI average over the test duration, for example 30 sec. The filtering includes for example a threshold of 1 kbps, or any value between 1 kbps and 10 Mbps, and RSSI samples are dropped if the receive data rate is below the threshold. The RSSI samples are aggregated, when the receive data rate is above that threshold.

For the passive monitoring, it is further important to separate issues at the receiver side from CCA (Clear Channel Assessment) related issues. There the fact can be used that the rate adaptation algorithm in any WLAN node aims at reducing packet loss by stepping down to lower modulation rates and less spatial streams. If we define "TrainedPhyRate" 32 as the modulation rate that is used when the link is trained, we can approximatively assume that problems on the receive side:packet loss is minimal at this physical layer rate.

Further performance loss can be caused by the CCA mechanism blocking the transmitter to send packets. This can be assessed by using the CCA statistics: medium busy/ medium busy other Wi-Fi 33. Actual available performance can be assessed through CCA statistics and knowledge of the TrainedPhyRate 32, or through an active test.

Medium sharing may cause further performance loss: WLAN is using a shared medium concept based on a CSMA-CA (Carrier Sense Multiple Access/Collision Avoidance) medium access method. The performance will drop if more devices are sharing the medium. More difficult is to distinguish what is causing the problems on the receiver side, i.e. interference: then the end-user should change the Wi-Fi channel; or physics: then the end-user should move the access point 1 or the station 2.

Also interference may cause performance loss: The connection speed drops due to the presence of interference. Instead of SNR (signal to noise ratio), SiNR (signal to interference noise ratio) applies which impacts either the physical layer rate or the medium availability. Performance loss is also caused by physics limitations: The connection speed drops due to SNR degradation and a reduced ability to use multiple spatial streams (MIMO: multiple-input and multiple-output). It is noted that MIMO systems leverage on the ability to use a multitude of spatial streams in order to achieve high link speeds.

The PhysLimitsPhyRate 31, FIG. 2, can be understood as the boundary between performance lost due to physical effects ("physics") and performance lost due to interference at the receiver side. PhysLimitsPhyRate 31 is partly defined by extrapolating what physical layer rate would be used in dependence of the measured signal strength (RSSI)—in the absence of interference. This extrapolation may be based for example on reference measurements in a clean environment: this can be in a conducted set up or in a radiated set up. This covers also performance lost due to high path loss, leading to a low signal strength.

The maximum available physical layer rate for the transmission between the access point 1 and the station 2, MaxPhyRate 30, as negotiated, can be obtained for example from table 1 below, which includes the maximum available data rates for the IEEE standards 802.11b, 802.11g and 802.11n as a function of the number of spatial streams (MIMO Configuration), channel bandwidth (20 or 40 MHz), and SGI (Short Guard Interval), being enabled or not enabled.

TABLE 1

| 802.11b | 1 × 1:1 | 11 | NA | NA | NA |
| 802.11g | 1 × 1:1 | 54 | NA | NA | NA |
| 802.11n | 1 × 1:1 | 65 | 72.2 | 135 | 150 |
| 802.11n | 2 × 2:2 | 130 | 144.4 | 270 | 300 |
| 802.11n | 3 × 3:3 | 195 | 216.7 | 405 | 450 |
| 802.11n | 4 × 4:4 | 260 | 288.9 | 540 | 600 |

For applying the method, advantageously two parts are provided: a test application running on client devices (Android, iOS, PC, etc. . . . ) and a test application running on the gateway (AP). When using both, optimum measurement results are obtained at both ends of the wireless link by reading critical values from the software drivers. In particular the following data are considered by the method: Path loss and multiple spatial streams for determining physical limitations; non-WLAN interference: at Transmit-side or at Receiver-side; WLAN traffic from neighbouring WLANs; Rate Adaption, depending on RSSI; and RSSI.

The active test includes in particular the following steps: Step 1: Launches Ping Test from AP to STA, e.g. an Android device, having the goals: Goal1: wake up TX and RX members before TX test, and Goal2: solve number of spatial streams dilemma by checking RX and TX physical rate (PhyRate) at the AP; Step 2: Launches Active layer 2 (L2) TX test from AP to STA; and Step 3: Display categories in percent on a graphical user interface (GUI), see for example FIG. 6, described below. These steps are described in more detail in a previous patent application WO 2015/044343, which is incorporated herein by reference.

For calculating losses of a wireless link of a Wi-Fi node between a customer premises equipment device and a station in a correct manner during the passive monitoring test, it is in particular important to take samples of one or several of the following parameters in a defined time interval, e.g. every second: Received Signal Strength (RSSI), Modulation rate (TrainedPhyRate) and/or the number of spatial streams used for a given Wi-Fi link, and calculating an average for that parameters by including a filtering of said parameters. The filtering is used in particular to filter out non-data frames, e.g. control frames, which do not contribute to the Wi-Fi transmission rate.

The method described relies amongst others on the availability of reference data, in an interference-free environment, related to the RSST as well as of the Modulation rate (TrainedPhyRate) and the number of Spatial Streams used for a given Wi-Fi link to define the boundary between performance lost due to physical effects and performance lost due to interference at the receiver side. But it is not trivial task to obtain the correct statistics, as there are mechanisms, e.g. the power save mechanisms, in place that influence the above mentioned parameters in such a way that they cannot be used as such to understand the quality of the Wi-Fi link. E.g. a Wi-Fi implementation can reduce the number of spatial streams and/or the modulation rate to reduce power consumption, rather than in reaction to interference, which would prohibit the use of multiple spatial streams and/or of higher modulation rates. When doing an active test,—by forcing data traffic through the Wi-Fi link, most implementations will abandon these power-save actions, and a normal averaging of the above-mentioned parameters will provide—in most cases—accurate statistics that yield a correct quality assessment of the Wi-Fi link.

In case of a passive, Wi-Fi quality monitoring, however, such an active test is to be avoided. So for such passive monitoring tools, a way to collect adequate statistics that can avoid power save artefacts is needed. How to achieve that is described in the patent application WO 2015/044343. The method described involves filtering of the samples taken so as to retain only the meaningful samples for calculating the average of the relevant parameters.

Figure 4:
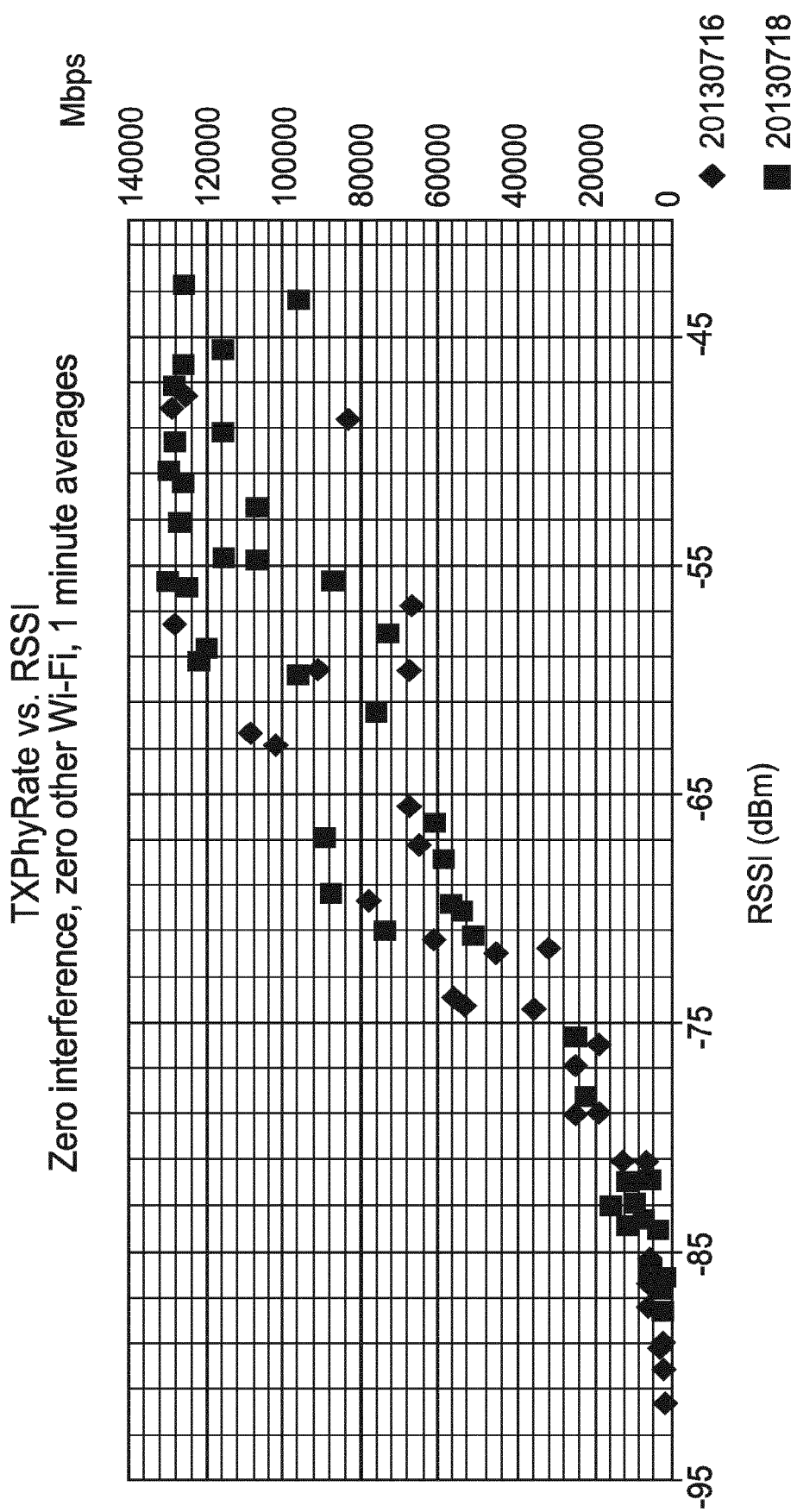

The main problem with the current state of the art relates to the boundary between performance lost due to physical effects and performance lost due to interference at the receiver side. As described above, reference data in an interference-free environment are used to define this boundary. The problem is that there is a large degree of uncertainty if these reference data are recorded in realistic environments. FIG. 4 shows two sets of measured reference data for IEEE 802.11n 2×2 streams between an AP and a STA, measured at two different days, in an interference-free environment and for different conditions of path loss, that demonstrate this uncertainty: in particular the TrainedPhyRates from AP to STA in a region between a RSSI values of −55 to −75 dBm vary between 70 Mbps and 120 Mbps.

This uncertainty is not a test problem or a test artefact. It is a reflection of the different RF channel conditions of the Wi-Fi link. Time and frequency dispersion in the RF channel between transmitter and receiver can distort the signal on receiver side, resulting in a lower TrainedPhyRate as compared to what can be expected for a given RSSI in case of a perfect RF channel, e.g. in conducted measurements. Another physical effect is related to spatial streams. Depending on the presence of multiple RF paths between transmitter and receiver, i.e. depending on whether reflections of the direct RF path between transmitter and receiver exist, it can be possible—or not- to set up multiple spatial streams even without the presence of any interference.

A remaining problem to solve is therefore to assign the decrease of the TrainedPhyRate, as compared to what can be achieved for a given RSSI in perfect conditions, to either physical effects, i.e. lack of reflections and channel conditions, or to far-end interference, i.e. external interference on the receiver side lowering the Received Signal to Noise and Interference Ratio, for those test measurements that are in this uncertainty zone.

First step of the analysis is to separate issues at receiver side from CCA related issues. There we can use the fact the rate adaptation algorithm in any Wi-Fi node aims at reducing packet loss by stepping down to lower modulation rates and less spatial streams. If we define "TrainedPhyRate" as the modulation rate that is used when the link is trained, we can approximatively assume that problems on receive side/ packet loss is minimal at this PhyRate.

Further performance loss can be caused by the CCA mechanism blocking the transmitter to send packets. This can be assessed by using the CCA statistics (medium busy/ medium busy other Wi-Fi). Actual available performance can be assessed through CCA statistics and knowledge of Trained PhyRate, or through an active test.

More difficult is to distinguish what is causing the problems on receiver side (i.e. interference>change channel; or physics>move AP or STA). For this, we define PhysLimitsPhyRate as the boundary between performance lost due to "physics" and performance lost due to interference at receiver side. PhysLimitsPhyRate is partly defined by extrapolating what PhyRate would be used in case of the measured signal strength (RSSI)—in the absence of interference. This extrapolation is based on reference measurements in a clean environment—this can be in a conducted set up or in a radiated set up.

This covers performance lost due to high path loss, low signal strength.

The second factor defining PhysLimitsPhyRate is related to the possibility to set up multiple spatial streams or not. Depending on the environment, presence or absence of multiple reflections/spatial paths, (de-)correlation of the signal seen by the different receivers. To take this into account, we use the measured average number of spatial streams as used by the link under traffic.

The above method can be improved by additionally performing—before or after the active test—a passive test, which is a monitoring mode during which a data transmission of the CPE device is monitored, to obtain a second set of parameters. In particular, based on the first set of parameters, it is determined whether and to which extent the wireless link is in an uncertainty zone, and based on the second set of parameters, the decision is made to assign an observed decrease in a measured data rate (TrainedPhyRate) to physics effects or to Far End Interference effects.

For a preferred embodiment, the improvement can be summarized with the following steps:
  Determine the uncertainty zone of the TrainedPhyRate as depending on the RSSI values, as described with regard to FIG. 4. This can be broken down into Modulation Rate/Spatial Stream versus RSST, number of Spatial Streams versus RSSI, usage of SGI (Short Guard Interval) versus RSSI. Alternatively, the TrainedPhyRate can be considered as a combination of the above.

An active test is executed by the transmitter to obtain the TrainedPhyRate of a given Wi-Fi link, during which the Wi-Fi link is fully loaded. During this test, a first set of relevant parameters is recorded: in particular RSSI, PhyRate/MCS values, and number of spatial streams used.

Immediately before and/or after the active test, the transmitter passively records a second set of relevant parameters.

Based on the first set of parameters, it is determined whether and to which extent the tested link is in the uncertainty zone.

Based on the second set of parameters, the decision is made to assign the observed decrease of the TrainedPhyRate to Physical effects or to Far End Interference.

The active test is needed to fully execute the link and get reliable values of TrainedPhyRate, RSSI etc. This active test will also yield the real, rather than an extrapolated, data rate that can be achieved over this Wi-Fi link. However, during the active test, it is impossible to accurately sense the medium and listen to signs of interference: mainly CCA statistics like medium availability, glitches, etc.,—referring to the analogy that you cannot listen while talking. The second set of parameters solves this problem and allows to use the "signatures" observed while sensing the medium to distinguish "Far End Interference" issues from "Physics".

Figure 5:
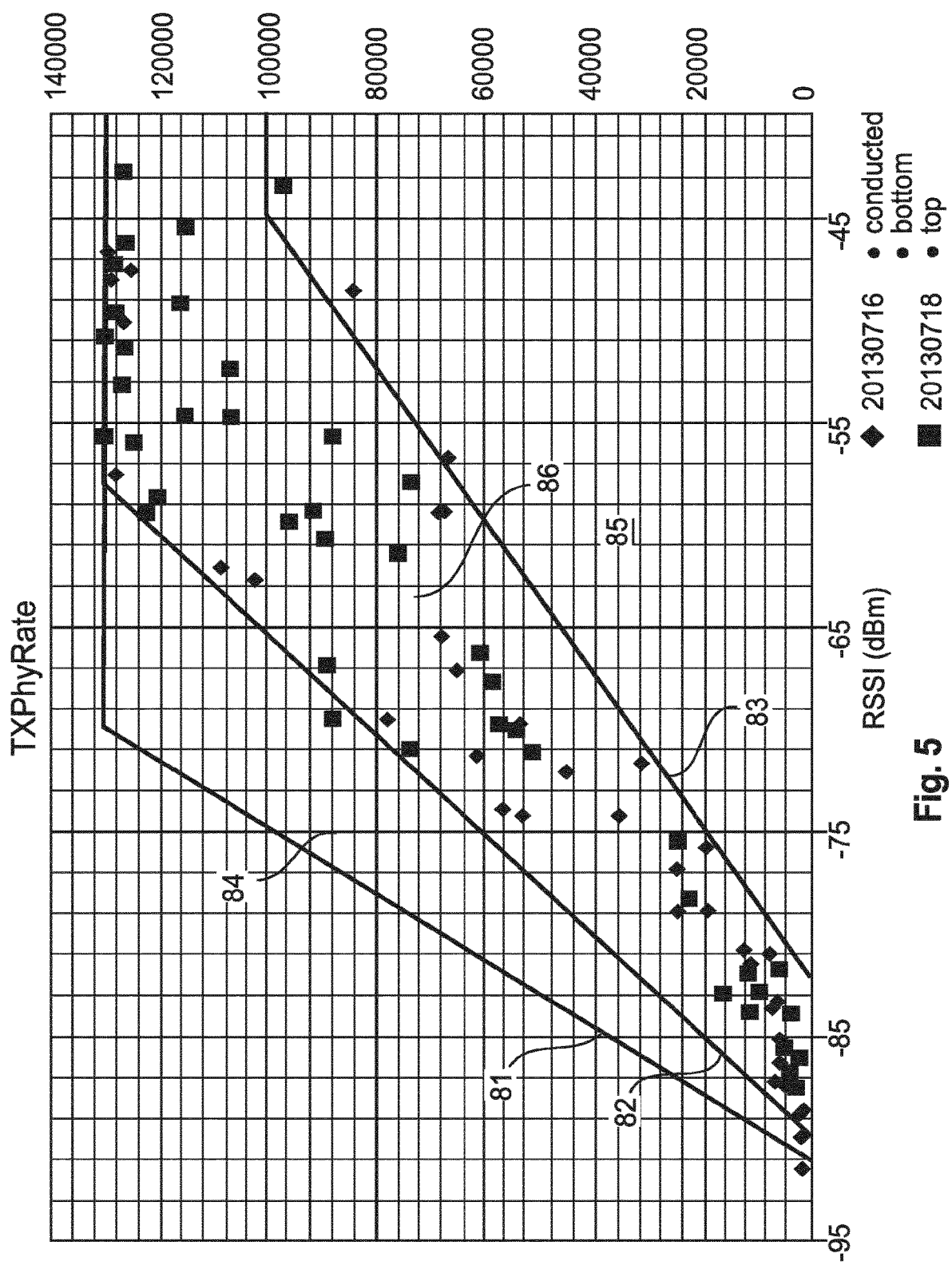

In more detail, according to a preferred embodiment with reference to FIG. 5, the method includes:

Determine the uncertainty zone in "TrainedPhyRate" versus "RSSI" correlation. This can be broken down into the determination of: Modulation Rate/Spatial Stream versus RSSI, number of Spatial Streams versus RSSI, usage of SGI (Short Guard Interval) versus RSSI. Alternatively "Trained PhyRate" can be considered as a combination of the above.

Referring to FIG. 5, "TxPhyRate": The depicted measurement points are reference data, Trained TxPhyRate versus RSSI, recorded in an interference-free environment on two different days: 20130716 and 20130718. Line 81, "conducted", shows the maximum theoretical TxPhyRate "MaxPhyRate" versus RSST in a perfect conducted environment. Obviously, below −65 dBm, the conducted results are not representative for even the best radiated measurement points.

Therefore, a "top" boundary is used, line 82, and a "bottom" boundary, line 83, on the edges of the reference measurement points, to define the uncertainty zone.

Figure 6:
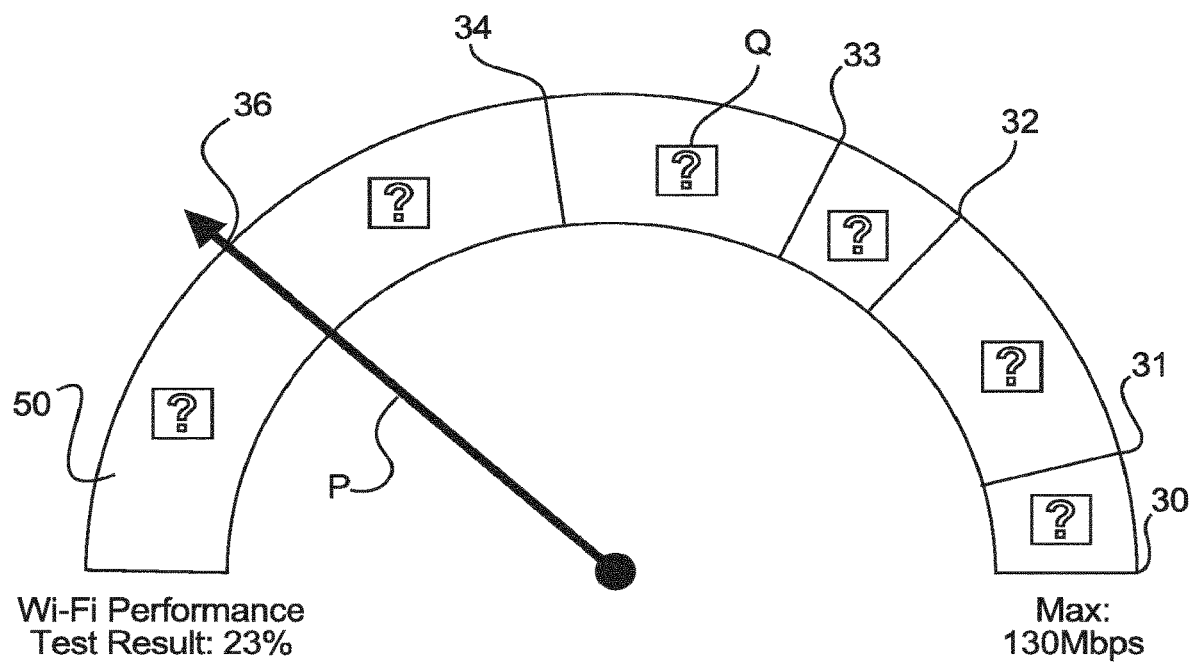

The performance loss represented by the difference between "MaxPhyRate", line 81, and the top boundary, line 82, is called "% SureBlueRegion", region 84, corresponding with an area between 30 and 31 of FIG. 6, and is always assigned to physical effects. The performance loss represented by the region below line 83, difference between "RedBorderPhyrate", and "TrainedPhyRate", line 32 of FIG. 2, is called "SureRedRegion", region 85, corresponding with the area between 31-32 of FIG. 6, and is always assigned to interference. The area between the bottom boundary 83 and the top boundary 82 is called "PurpleRegion", region 86, which is the uncertainty region.

An active test is executed by the transmitter to obtain the TrainedPhyRate 32 of a given Wi-Fi link, during which the Wi-Fi link is fully loaded. During this test, the first set of relevant parameters are recorded, amongst others, RSSI, PhyRate and MCS values, and number of spatial streams used.

Immediately before and/or after the active test, the transmitter passively records the second set of parameters while generating a some amount of uplink and downlink traffic. This can be done for example by providing a ping test.

Based on the first set of parameters, it is determined whether and to which extent the tested link is in the uncertainty zone 86, e.g. within RSSI values of −75 dBm and −55 dBm, as depicted in FIG. 5. The first set of parameters yields all info needed to assess the performance factors impacting the transmitter side of the Wi-Fi link, i.e. power save effects, sharing the medium, near end interference, as well as the main parameter to distinguish transmitter side and receiver side, i.e. Trained PhyRate, and the proper RSSI value. The top boundary 82 can be calculated directly from the observed RSSI value.

Based on the second set of parameters, the decision is made to assign the observed decrease in TrainedPhyRate 32 to "Physics" or to "Far End Interference".

The first part of this decision lies in correcting the bottom boundary 83 with information regarding the ratio of average number of spatial streams uplink versus downlink, as recorded in the second set of parameters. This is because the asymmetric nature of the active test will not provide an accurate view on the uplink. This correction shifts the bottom boundary 83, in case the ratio of average number of spatial streams Uplink versus Downlink indicates Far End Interference, i.e. a lower average number of spatial streams Downlink.

The second part consists of assigning the uncertainty region 86 to Far End Interference, in case the CCA statistics in the second set of parameters indicate the presence of near end interference, i.e. % of time that the medium is not used and is not available above a certain threshold, e.g. 5% of time.

The method described relies on the availability of correct statistics related to the quality of the Wi-Fi link, such as but not limited to Signal Strength (RSSI) as well as of the Modulation rate (Physical Rate) and the number of Spatial Streams used for a given Wi-Fi link. It is not a trivial task to obtain the correct statistics, as there are power save mechanisms in place that influence the above mentioned parameters in such a way that they cannot be used as such to understand the quality of the Wi-Fi link. E.g. a Wi-Fi implementation can reduce the number of spatial streams and/or the modulation rate to reduce power consumption—rather than in reaction to interference which would prohibit the use of multiple spatial streams and/or of higher modulation rates.

When doing an active test—i.e. forcing traffic through the Wi-Fi link, most implementations will abandon these power-save actions, and a normal averaging of the above-mentioned parameters will provide—in most cases—accurate statistics that yield a correct quality assessment of the Wi-Fi link. Tn case of a passive, Wi-Fi quality monitoring, however, such an active test is to be avoided. So for such passively monitoring tools, a way was found to collect adequate statistics that can avoid power save artefacts.

The passive monitoring test takes samples of the above-mentioned parameters on a short time scale, e.g. every second. Rather than taking just the average of the samples taken over a certain interval—averaging is certainly needed to obtain reliable results—a filtered average is used. This means that only those samples are retained for calculating the average that are taken at moment when sufficient traffic is flowing over the link. This can be deduced from the TxRate and RxRate parameters that are also sampled every second. By taking the correct threshold for the TxRate and/or RxRate measurement, the filtered average can avoid the artefacts caused by power save mechanisms, and ensure that only correctly "trained" values of the relevant parameters such as PhyRate, RSSI, and number of spatial streams are considered.

The obtained results can be displayed for a user on a display of his station 2 by the test application 13 for example as consecutive blocks forming a semi-circle, as shown in FIG. 6. The data rates as explained with regard to FIG. 2 define the length of each block. A pointer P visualizes the finally attainable data rate 36, which is in this embodiment 23% of the theoretically available data rate of 130 MB/s. Each of the blocks include a question mark Q, which can be selected by the user for example by using a mouse or a touchpad. By selecting one of the question marks Q, the user is informed about the problem which causes the throughput loss leading to the contribution of this block and gives an advice for the user, how he can improve the situation. In case of selecting the question mark Q of the block 50, the user is informed that the obtained data rate during the test was only 28 MB/s, 23% of the theoretically maximum rate of 130 MB/s.

Although embodiments which incorporate the teachings of the present disclosure have been shown and described in detail herein, those skilled in the art can readily devise many other varied embodiments that still incorporate these teachings. Having described preferred embodiments (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure.

The invention claimed is:

1. A method comprising:
    measuring a first data transmission sent by a wireless node of a customer premises equipment (CPE) device, to obtain a first set of parameters, wherein the first set of parameters comprise a measured data rate and an RSSI a Received Signal Strength Indicator (RSSI) value;
    determining one or more performance degradation zones based on the first set of parameters;
    monitoring a second data transmission of the wireless node, to obtain a second set of parameters, wherein the second set of parameters comprise measured RSSI values;
    determining a data throughput based on reference data for the measured RSSI values of the second set of parameters and a correction factor for a number of multiple spatial streams used for the second data transmission;
    calculating a maximum obtainable wireless data rate based on the data throughput; and
    identifying whether there is a performance degradation of the wireless node of the CPE based on comparing the calculated maximum obtainable wireless data rate and the one or more performance degradation zones.

2. The method of claim 1, further comprising:
    determining an uncertainty zone based on the first set of parameters and reference data, wherein the reference data comprises two sets of data rates with RSSI values measured at two different times in an interference free environment and for two different conditions of path loss; and
    upon determining the uncertainty zone, identifying the performance degradation due to a decrease in the measured data rate to a Physics effects or to a Far end Interference based on the second set of parameters.

3. The method of claim 2, wherein the first data transmission is sent using a maximum throughput of the wireless node.

4. The method according to claim 3, comprising:
    taking samples of one or more parameters in a time interval of a wireless link between the wireless node and a station, STA, wherein the one or more parameters selected from the group comprising of: RSSI, modulation rate, and the number of spatial streams used for the second data transmission;
    filtering the samples of the one or more parameters over the time interval to avoid artefacts caused by power save mechanisms; and
    calculating an average for the samples of the one or more parameters over the time interval, wherein the identifying the performance degradation is further based on the calculated average.

5. The method of claim 4, further comprising:
    taking samples of a transmission rate and receive rate in the time interval to calculate the traffic flowing over the wireless link; and
    filtering out all samples of the one or more parameters in the time interval where the traffic flowing over the wireless link does not meet a threshold.

6. The method of claim 5, wherein the number of multiple spatial streams is determined by checking the receive or the transmit rate at an access point or a station.

7. The method of claim 5, wherein the correction factor is determined based on comparing a number of spatial streams of a transmission from an access point to a station and a number of spatial streams of a transmission from a station to an access point in order to distinguish between environment and interference.

8. The method of claim 4, further comprising calculating a maximum possible data rate for the wireless link based on the calculated average.

9. A device comprising a processor operatively connected to a wireless node, the processor and wireless node configured to:
    measure a first data transmission sent by a wireless node of a customer premises equipment (CPE) device, to obtain a first set of parameters, wherein the first set of parameters comprise a measured data rate and a Received Signal Strength Indicator, (RSSI), value;
    determine one or more performance degradation zones based on the first set of parameters;
    monitor a second data transmission of the wireless node, to obtain a second set of parameters, wherein the second set of parameters comprise measured RSSI values;
    determine a data throughput based on reference data for the measured RSSI values of the second set of parameters and a correction factor for a number of spatial streams used for the second data transmission;
    calculating a maximum obtainable wireless data rate based on the data throughput; and
    identify whether there is a performance degradation of the wireless node of the CPE based on comparing the calculated maximum obtainable wireless data rate and the one or more performance degradation zones, the first set of parameters, and the second set of parameters.

10. The device of claim 9, further comprising:
    determine an uncertainty zone by based on the first set of parameters and reference data, wherein the reference data comprises two sets of data rates with RSSI values measured at two different times in an interference free environment and for two different conditions of path loss; and upon determining that the uncertainty zone, identifying the performance degradation due to a decrease in the measured data rate to a Physics effects or to a Far end Interference based on the second set of parameters.

11. The device of claim 10, wherein the first data transmission is sent using a maximum throughput of the wireless node.

12. The device of claim 11, where the processor and wireless node are further configured to:

take samples of one or more parameters in a time interval of a wireless link between the wireless node and a station, STA, wherein the one or more parameters selected from the group comprising of: RSSI, modulation rate, and the number of spatial streams used for the second data transmission;

filter the samples of the one or more parameters over the time interval to avoid artefacts caused by power save mechanisms; and calculate an average for the samples of the one or more parameters over the time interval, wherein the identifying the performance degradation is further based on the calculated average.

13. The device of claim 12, the processor and wireless node configured to:

take samples of a transmission rate and receive rate in the time interval to calculate the traffic flowing over the wireless link; and filter out all samples of the one or more parameters in the time interval where the traffic flowing over the wireless link does not meet a threshold.

14. The device of claim 13, wherein the number of multiple spatial streams is determined by checking the receive or the transmit rate at an access point or a station.

15. The device of claim 13, wherein the correction factor is determined based on comparing a number of spatial streams of a transmission from an access point to a station and a number of spatial streams of a transmission from a station to an access point in order to distinguish between environment and interference.

16. The device of claim 12, the processor and wireless node configured to calculate a maximum possible data rate for the wireless link based on the calculated average.

* * * * *